United States Patent
Ellis et al.

(10) Patent No.: US 10,465,082 B2
(45) Date of Patent: Nov. 5, 2019

(54) AQUEOUS INK-JET INK CONTAINING POLYURETHANE BINDER FOR PRINTING ON TEXTILE

(71) Applicant: E I DU PONT DE NEMOURS AND COMPANY, Wilmington, DE (US)

(72) Inventors: Scott W. Ellis, Wilmington, DE (US); Xiaoqing Li, Newark, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 214 days.

(21) Appl. No.: 15/520,982

(22) PCT Filed: Oct. 20, 2015

(86) PCT No.: PCT/US2015/056356
§ 371 (c)(1),
(2) Date: Apr. 21, 2017

(87) PCT Pub. No.: WO2016/064810
PCT Pub. Date: Apr. 28, 2016

(65) Prior Publication Data
US 2017/0355866 A1 Dec. 14, 2017

Related U.S. Application Data

(60) Provisional application No. 62/067,209, filed on Oct. 22, 2014.

(51) Int. Cl.
| | | |
|---|---|---|
| *C09D 11/322* | (2014.01) | |
| *C09D 11/00* | (2014.01) | |
| *C09D 11/30* | (2014.01) | |
| *C09D 11/326* | (2014.01) | |
| *D06P 5/30* | (2006.01) | |
| *D06P 1/44* | (2006.01) | |
| *D06P 1/54* | (2006.01) | |
| *D06P 1/52* | (2006.01) | |
| *C09D 11/03* | (2014.01) | |
| *C09D 11/102* | (2014.01) | |

(52) U.S. Cl.
CPC ............ *C09D 11/322* (2013.01); *C09D 11/00* (2013.01); *C09D 11/03* (2013.01); *C09D 11/102* (2013.01); *C09D 11/30* (2013.01); *C09D 11/326* (2013.01); *D06P 1/44* (2013.01); *D06P 1/5285* (2013.01); *D06P 1/54* (2013.01); *D06P 5/30* (2013.01)

(58) Field of Classification Search
CPC ....... C09D 11/322; C09D 11/03; C09D 11/00; C09D 11/326; C09D 11/102; D06P 1/5285
USPC ................................. 523/160, 161; 524/591
See application file for complete search history.

(56) References Cited

U.S. PATENT DOCUMENTS

| | | |
|---|---|---|
| 3,479,310 A | 11/1969 | Dieterich et al. |
| 4,108,814 A | 8/1978 | Reiff et al. |
| 4,408,008 A | 10/1983 | Markusch |
| 5,990,245 A | 11/1999 | Esselborn et al. |
| 6,248,839 B1 | 6/2001 | Esselborn et al. |
| 6,316,586 B1 | 11/2001 | Sunkara et al. |
| 2005/0182154 A1 | 8/2005 | Berge et al. |
| 2013/0137816 A1* | 5/2013 | Berge .................. C09D 11/326 524/591 |

FOREIGN PATENT DOCUMENTS

| | | |
|---|---|---|
| WO | 2012/030890 A2 | 3/2012 |
| WO | 2013/096344 A1 | 6/2013 |

OTHER PUBLICATIONS

PCT International Search Report for Application No. PCT/US2015/056356; Feldmann, Gabriele, Authorized Officer; ISA/EPO; dated Dec. 17, 2015.

\* cited by examiner

Primary Examiner — Doris L Lee
(74) Attorney, Agent, or Firm — Simon L. Xu

(57) ABSTRACT

This disclosure relates to novel aqueous ink-jet inks having improved image properties containing an aqueous vehicle, a cross-linked pigment dispersion, and a cross-linked polyurethane binder. The inks are particularly advantageous for printing on textile.

10 Claims, No Drawings

AQUEOUS INK-JET INK CONTAINING POLYURETHANE BINDER FOR PRINTING ON TEXTILE

CROSS REFERENCE TO RELATED APPLICATIONS

This application claims priority under 35 U.S.C. § 119 from U.S. Provisional Application Ser. No. 62/067,209, filed Oct. 22, 2014, which is incorporated by reference in its entirety.

BACKGROUND OF THE DISCLOSURE

This disclosure relates to novel aqueous ink-jet inks containing an aqueous vehicle, a cross-linked pigment dispersion, and a cross-linked polyurethane binder. The inks improves image properties when printed, and are particularly advantageous for printing on textile.

Ink-jet digital printing method is becoming increasingly important for the printing of textiles. It offers a number of potential benefits over conventional printing methods such as screen printing. Digital printing eliminates the set-up expense associated with screen preparation and can potentially enable cost-effective short run production. Digital printing furthermore allows visual effects, such as tonal gradients and repeat of printed patterns that cannot be practically achieved with a screen printing process. Especially beneficial is the ease in changing the patterns of originals during production of digital printing, when it is possible to respond to a change in patterns or other requirements within a short period of time.

U.S. Patent Application Publication No. 20050182154 discloses an inkjet ink containing cross-linked polyurethanes as a binder for printing on textile.

U.S. Patent Application Publication No. 20130137816 discloses an inkjet ink containing a self-dispersing pigment or pigment dispersed by a polyurethane dispersant followed by cross-linking the polyurethane dispersant.

WO03/029318 describes polyurethane block copolymers as dispersants for inks. These polyurethanes are cross-linked prior to inversion (addition of water to produce the polyurethane dispersion) not during or after inversion. There is also crosslinking derived from the added melamine cross-linker which is only effective at high temperatures and/or acidic conditions that occur at the time of the textile treatments after printing.

A need exists for stable ink-jet inks with superior jetting properties that can be printed on various substrates to form durable, high quality image. The present disclosure satisfies this need by providing an ink containing a colorant that is dispersed by a polyurethane dispersant followed by cross-linking, and a cross-linked polyurethane binder which is different from the polyurethane dispersant.

SUMMARY OF THE DISCLOSURE

An embodiment of the present disclosure provides An ink-jet ink for printing on textile comprising an aqueous ink vehicle, an aqueous pigment dispersion and a cross-linked polyurethane binder, wherein said aqueous pigment dispersion is prepared by dispersing a colorant with a polyurethane dispersant followed by cross-linking of said dispersant, and said cross-linked polyurethane binder is different from said polyurethane dispersant and non-reactive to said colorant, and wherein said polyurethane dispersant prior to being cross-linked comprises at least one compound of the general structure of Formula I:

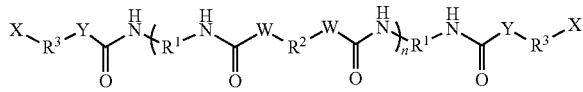

wherein each X is independently OH, SH, COOH or $NR^4R^5$;
each Y is independently O, S or $NR^4$;
each W is NH, O or S;
each $R^1$ is independently $C_1$-$C_{20}$ alkylene, $C_3$-$C_{20}$ substituted alkylene, $C_6$-$C_{40}$ arylene or $C_9$-$C_{40}$ substituted arylene;
$R^2$ is comprised of difunctional isocyanate reactants $Z^1$, $Z^2$ and $Z^3$, wherein $Z^2$ may be the same as $Z^1$, or $Z^2$ may be the same as $Z^3$, provided that $Z^2$ has one or more cross-linkable moieties;
each $R^3$ is independently $C_1$-$C_{20}$ alkyl or $C_3$-$C_{20}$ substituted alkyl;
each $R^4$ is independently —$R^3$—A, $C_1$-$C_{20}$ alkyl or $C_3$-$C_{20}$ substituted alkyl;
each A is independently OH, SH or COOH;
each $R^5$ is independently $C_1$-$C_{20}$ alkyl or $C_3$-$C_{20}$ substituted alkyl;
$NR^4R^5$ can be taken together with Z to form a 5-membered through 7-membered cyclic structure of Formula II:

$$R^4\underset{N}{\overset{Z}{\diagup\!\!\!\diagdown}}R^5;\qquad(II)$$

Z is —$(CH_2)$—, —$(CH_2)_2$—, $NR^6$, O or S;
$R^6$ is H or $C_1$-$C_{20}$ alkyl;
n is an integer from 2 to 30;
$Z^1$ is a difunctional isocyanate reactant substituted with an aqueous dispersing moiety;
$Z^2$ is a difunctional isocyanate reactant substituted with one or more cross-linkable moieties; and
$Z^3$ is a polyol with a weight average molecular weight of less than 3000.

Another embodiment provides that the cross-linking agent is one or more members selected from the group consisting of epoxide, isocyanate, carbodiimide, N-methylol, oxazoline, silane, and mixtures thereof.

Another embodiment provides that Y is $NR^4$.
Another embodiment provides that X is OH.
Another embodiment provides that X is $NR^4R^5$.
Another embodiment provides that $NR^4R^5$ is taken together with Z to form a 5-membered through 7-membered cyclic structure of Formula II:

$$R^4\underset{N}{\overset{Z}{\diagup\!\!\!\diagdown}}R^5.\qquad(II)$$

Another embodiment provides that $NR^4R^5$ is taken together with Z to form a 6-membered ring.

Another embodiment provides that Z is O.

Another embodiment provides that $R^4$ and $R^5$ are independently $C_1$-$C_3$ alkylene.

Yet another embodiment provides that the ink does not contain a melamine crosslinker.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the dispersions produced with the polyurethane described above can be utilized to disperse particles, especially pigments for ink-jet inks. These inks can be printed on all normally used ink-jet substrates including textile substrates.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the tem "ionizable groups," means potentially ionic groups.

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "substituted alkyl" denotes substitution of hydrogen atom(s) on an alkyl moiety by functional group(s) including ethers, esters, amines, thioether, mercaptans, hydroxy, halides, and acid groups, etc.

As used herein, the term "substituted aryl" denotes substitution of hydrogen atom(s) on an aryl moiety by functional group(s) including ethers, esters, amines, thioether, mercaptans, hydroxy, halides, and acid groups, etc.

As used herein, the term "substituted alkylene" denotes substitution of hydrogen atom(s) on an alkylene moiety by functional group(s) including ethers, esters, amines, thioether, mercaptans, hydroxy, halides, and acid groups, etc.

As used herein, the term "substituted arylene" denotes substitution of hydrogen atom(s) on an arylene moiety by functional group(s) including ethers, esters, amines, thioether, mercaptans, hydroxy, halides, and acid groups, etc.

As used herein, the term "pendent" means that a substituent is directly attached to the backbone of a polymer or via a linkage of 1 to 10 atoms.

As used herein, the term "NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "prepolymer" means the polymer that is an intermediate in a polymerization process, and can be considered a polymer.

As used herein, the term "AN" means acid number, mg KOH/gram of solid polymer.

As used herein, the term "PUD" means the polyurethanes dispersions described herein.

As used herein, the term "BMEA" means bis(methoxyethyl)amine.

As used herein, the term "DBTDL" means dibutyltin dilaurate.

As used herein, the term "DEA" means diethanolamine.

As used herein, the term "DMPA" means dimethylol propionic acid.

As used herein, the term "HDI" means 1,6-hexamethylene diisocyanate.

As used herein, the term "IPDI" means isophorone diisocyanate.

As used herein, the term "TMDI" means trimethylhexamethylene diisocyanate.

As used herein, the term "TMXDI" means m-tetramethylene xylylene diisocyanate.

As used herein, the term "NMP" means n-Methyl pyrolidone.

As used herein, the term "TDI" means 2,4-toluene diisocyanate.

As used herein, the term "MDI" means 4,4'-diphenylmethane diisocyanate.

As used herein, the term "$H_{12}$MDI" means 4,4'-dicyclohexylmethane diisocyanate.

As used herein, the term "TODI" means 3,3'-dimethyl-4,4'-biphenyl diisocyanate.

As used herein, the term "$C_{12}$DI" means dodecane diisocyanate.

As used herein, the term "NDI" means 1,5-naphthalene diisocyanate.

As used herein, the term "IPDI" means isophorone diisocyanate.

As used herein, the term "TEB" means triethylene glycol monobutyl ether, a reagent supplied by Dow Chemical.

As used herein, the term "Sulfolane" means tetramethylene sulfone.

As used herein, the term "TRB-2" means Dainichiseika® TRB-2, a cyan pigment.

As used herein, Terathane® 650 is a polyether diol from Invista, Wichita, Kans.

As used herein, Eternacoll® UH-50 is a polycarbonate diol from UBE Industries, Tokyo, Japan.

As used herein, Denacol® 321 is trimethylolpropane polyglycidyl ether, a cross-linking reagent from Nagase Chemicals Ltd., Osaka, Japan.

As used herein, Denacol® 313 is glycerol polyglycidyl ether, a cross-linking reagent from Nagase Chemicals Ltd., Osaka, Japan.

Unless otherwise noted, the above chemicals were obtained from Aldrich (Milwaukee. Wis.) or other similar suppliers of laboratory chemicals.

In addition, references in the singular may also include the plural (for example, "a" and "an" may refer to one, or one or more) unless the context specifically states otherwise.

Polyurethane Dispersants

Polyurethane polymers are, for the purposes of the present disclosure, polymers wherein the polymer backbone contains urethane linkage derived from the reaction of an isocyanate group (from, e.g., a di- or higher-functional monomeric, oligomeric or polymeric polyisocyanate) with a hydroxyl group (from, e.g., a di- or higher-functional monomeric, oligomeric or polymeric polyol). Such polymers may, in addition to the urethane linkage, also contain other isocyanate-derived linkages such as urea, as well as other types of linkages present in the polyisocyanate components or polyol components (such as, for example, ester and ether linkage).

The polyurethane dispersant of the present invention comprises at least one compound of the general structure of Formula I:

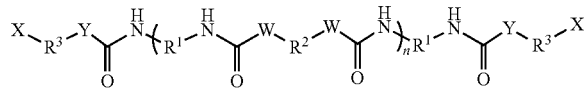
(I)

wherein each X is independently OH, SH, COOH or NHR$^4$;

each Y is independently O, S or NR$^4$;

each W is NH, O or S;

each R$^1$ is independently $C_1$-$C_{20}$ alkyl, $C_6$-$C_{40}$ aryl or $C_9$-$C_{40}$ substituted aryl;

R$^2$ is comprised of difunctional isocyanate reactants Z$^1$, Z$^2$ and Z$^3$, wherein Z$^2$ may be the same as Z$^1$, or Z$^2$ may be the same as Z$^3$, provided that Z$^2$ has one or more cross-linkable moieties;

each R$^3$ is independently $C_1$-$C_{20}$ alkyl;

each R$^4$ is independently —R$^3$—A, H, $C_1$-$C_{20}$ alkyl;

each A is independently OH, SH or COOH;

n is an integer from 2 to 30;

Z$^1$ is a difunctional isocyanate reactant substituted with an aqueous dispersing moiety;

Z$^2$ is a difunctional isocyanate reactant substituted with one or more cross-linkable moieties;

Z$^3$ is a polyol with MW less than 3000; and each R$^1$ and R$^3$ designate divalent groups.

Alternatively, each X is independently NR$^4$R$^5$; each R$^4$ is independently —R$^3$—A, $C_1$-$C_{20}$ alkyl or $C_3$-$C_{20}$ substituted alkyl; each R$^5$ is independently $C_1$-$C_{20}$ alkyl or $C_3$-$C_{20}$ substituted alkyl; NR$^4$R$^5$ can be taken together with Z to form a 5-membered through 7-membered cyclic structure of Formula II:

(II)

Z is —(CH$_2$)—, —(CH$_2$)$_2$—, NR$^6$, O or S; and R$^6$ is H or $C_1$-$C_{20}$ alkyl Typically, the Z$^2$ component in R$^2$ is a polyol substituted with one or more cross-linkable moieties. Typically these cross-linkable moieties are carboxyl, hydroxyl, amino or mercapto groups. The cross-linkable moieties that are terminal to the polymer chain are represented by the X group in Formula I. These cross-linkable moieties, upon reacting with a cross-linking agent, provide a cross-linked pigment dispersion having superior properties.

The R$^2$ group in Formula I is comprised of difunctional isocyanate reactants Z$^1$, Z$^2$ and Z$^3$, wherein there is at least one Z$^1$, at least one Z$^2$ and at least one Z$^3$. This R$^2$ group provides the polyurethanes with significant areas of hydrophobic segment which can be effective in dispersing pigments. While not being bound by theory, these areas of hydrophobic segment may be effective as the part of the dispersant that is associated with the pigment surfaces. The polyurethane dispersant must have at least one Z$^1$, at least one Z$^2$ and at least one Z$^3$ to satisfy the requirements that the polyurethane contains an aqueous dispersing moiety and a cross-linkable moiety. The blending of Z$^1$, Z$^2$ and Z$^3$ in the polyurethane can be in any sequence. In certain circumstances, Z$^2$ can be the same as Z$^1$, and in some other circumstances, Z$^2$ can be the same as Z$^3$, as long as there are cross-linkable moieties, as defined above, on Z$^2$. Depending on the sequence of addition during the synthesis of the polyurethane, the R$^2$ component (combination of Z$^1$, Z$^2$ and Z$^3$) can be random or in blocks.

Difunctional Isocyanate Reactant (Z$^2$) and Polyol (Z$^3$)

Often Z$^2$ and Z$^3$ are derived from polyolefins that are available from Shell as KRATON LIQUID L and Mitsubishi Chemical as POLYTAIL H. More specifically, Z$^2$ and Z$^3$ can be derived from polyester diols, polycarbonate diols, polyestercarbonate diols and polyacrylate diols.

Suitable polyester polyols include reaction products of polyhydric; dihydric alcohols to which trihydric alcohols may optionally be added, and polybasic (typically dibasic) carboxylic acids. Trihydric alcohols are limited to at most about 2 weight % such that some branching can occur but no significant cross-linking would occur, and may be used in cases in which modest branching of the NCO prepolymer or polyurethane is desired. Instead of these polycarboxylic acids, the corresponding carboxylic acid anhydrides, or polycarboxylic acid esters of lower alcohols, or mixtures thereof may be used for preparing the polyesters.

The polycarboxylic acids may be aliphatic, cycloaliphatic, aromatic or heterocyclic or mixtures thereof and they may be substituted, for example, by halogen atoms, or unsaturated. The following are mentioned as examples:

succinic acid, adipic acid, suberic acid, azelaic acid, sebacic acid, 1,12-dodecyldioic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate.

Typically, polyester diols can be blended with hydroxyl terminated poly(butylene adipate), poly(butylene succinate), poly(ethylene adipate), poly(1,2-propylene adipate), poly(trimethylene adipate), poly(trimethylene succinate), polylactic acid ester diol and polycaprolactone diol. Other hydroxyl terminated polyester diols are copolyethers comprising repeat units derived from a diol and a sulfonated dicarboxylic acid and prepared as described in U.S. Pat. No. 6,316,586.

Polycarbonates containing hydroxyl groups include those known, such as the products obtained from the reaction of diols such as propanediol-(1,3), butanediol-(1,4) or hexanediol-(1,6), diethylene glycol, triethylene glycol or tetraethylene glycol, and higher polyether diols with phosgene, diarylcarbonates such as diphenylcarbonate, dialkylcarbonates such as diethylcarbonate, or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Polycarbonate diols for blending are optionally selected from the group consisting of polyethylene carbonate diol, polytrimethylene carbonate diol, polybutylene carbonate diol and polyhexylene carbonate.

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. For further examples of making these diols, see: U.S. Pat. Nos. 6,248,839 and 5,990,245.

The MW for the polyols described above is typically less than 5000. Typically the MW for $Z^3$ (a polyol) is less than 3000.

Difunctional Isocyanate Reactant ($Z^1$)

The difunctional isocyanate reactant $Z^1$ in Formula I contains an aqueous dispersing moiety that is ionic or ionizable. In the context of this disclosure, the term "isocyanate reactant", or "isocyanate reactive", is taken to include groups well known to those of ordinary skill in the relevant art to react with isocyanates, and typically include hydroxyl, primary amino and secondary amino groups. The term "difunctional" means containing two of the isocyanate reactive groups.

Examples of ionic dispersing groups include carboxylate groups (—COOM), phosphate groups (—OPO$_3$M$_2$), phosphonate groups (—PO$_3$M$_2$), sulfonate groups (—SO$_3$M), and quaternary ammonium groups (—NR$_3$Q), wherein M is a cation such as a monovalent metal ion (e.g., Na$^+$, K$^+$, Li$^+$, etc.), H$^+$ or NR$_4^+$; Q is a monovalent anion such as chloride or hydroxide; and each R can independently be an alkyl, aralkyl, aryl or hydrogen. These ionic dispersing groups are typically located pendent to the polyurethane backbone.

The ionizable groups in general correspond to the ionic groups, except that they are in the acid (such as carboxyl —COOH) or base (such as primary, secondary or tertiary amine —NH$_2$, —NRH, or —NR$_2$) form. The ionizable groups are such that they are readily converted to their ionic form during the dispersion/polymer preparation process as discussed below.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula (HO)$_p$Q(COOH)$_q$, wherein Q is C$_1$-C$_{10}$ alkyl, p is 1 or 2, and q is 1 to 3. Examples of these hydroxycarboxylic acids include citric acid, tartaric acid and hydroxypivalic acid. Optional dihydroxy alkanoic acids include the α,α-dimethylol alkanoic acids represented by the structure of Formula III below:

(III)

wherein Q' is hydrogen or C$_1$-C$_8$ alkyl. Additional α,α-dimethylol alkanoic acids are represented by the structural formula R$^5$C—(CH$_2$OH)$_2$—COOH, wherein R$^5$ is hydrogen or C$_1$-C$_8$ alkyl. Examples of these ionizable diols include, but are not limited to, dimethylolacetic acid, 2,2'-dimethylolbutanoic acid, 2,2'-dimethylolpropionic acid (DMPA), and 2,2'-dimethylolbutyric acid. Suitable carboxylates also include H$_2$N—(CH$_2$)$_4$—CH(CO$_2$H)—NH$_2$, and H$_2$N—CH$_2$—CH$_2$—NH—CH$_2$—CH$_2$—CO$_2$Na.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula H$_2$N—CH$_2$—CH$_2$—NH—(CH$_2$)$_r$—SO$_3$Na, wherein r is 2 or 3.

When the ionic stabilizing groups are acids, the acid groups are incorporated in an amount sufficient to provide an acid group content for the polyurethane, known by those skilled in the art as acid number (mg KOH per gram solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a prepolymer, either volatile or nonvolatile basic materials may be used to form the counterion of the anionic group. Volatile bases are those wherein at least about 90% of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile bases include alkoxides, hydroxides, carbonates or bicarbonates of monovalent metals, especially the alkali metals, lithium, sodium and potassium.

When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface. Reducing the amount of the un-adsorbed polymer from the pigment dispersion provides an advantageous condition for the cross-linkable moieties on the polyurethane, adsorbing onto the pigment surface, to react with a cross-linking agent without the competition from cross-linkable moieties on the un-adsorbed polyurethane. Typically the degree of neutralization is from 40% to 100%, and more typically from 50% to 70%, depending on the acid number of the polyurethane.

Capping of the Polyurethane

The capping agent for terminating the polyurethane chain is usually a primary or secondary amine, an alcohol, or a mercapto. In Formula I, the capping agent is shown as a X—$R^3$—Y— substituent on the polyurethane.

The amount of capping agent employed should be approximately equivalent to the free isocyanate groups in the prepolymer. The ratio of active hydrogens from amine in the capping agent to isocyanate groups in the prepolymer is in the range of from about 1.0:1.0 to about 3.0:1.0, more typically from about 1.0:1.0 to about 1.5:1.0, and still more typically from about 1.0:1.0 to about 1.05:1, on an equivalent basis. Although any isocyanate groups that are not terminated with an amine can react with other isocyanate reactive functional group or water, the ratios of capping agent to isocyanate groups is chosen to ensure a urea termination. Amine termination of the polyurethane is avoided by the choice and amount of capping agent leading to a urea terminated polyurethane. This results in better molecular weight control and better properties when used as a particle dispersant, and ease in handling when added to formulations.

Any primary or secondary amines substituted with reactive isocyanate groups may be used as chain terminators. Especially useful are aliphatic primary or secondary monoamines, or diamines. Less reactive isocyanate groups such as hydroxyl, carboxyl, and mercapto could also be used. Example of amines useful as chain terminators include, but are not restricted to, diethanolamine, monoethanolamine, 3-amino-1-propanol, isopropanolamine, N-ethylethanolamine, diisopropanolamine, 6-aminocaproic acid, 8-aminocaprylic acid, and 3-aminoadipic acid. An typical isocyanate reactive chain terminator is diethanolamine.

Polyisocyanate Component

Suitable polyisocyanates are those that contain either aromatic, cycloaliphatic or aliphatic groups bound to the isocyanate groups. Mixtures of these compounds may also be used. If aromatic isocyanates are used, cycloaliphatic or aliphatic isocyanates can be present as well.

Any diisocyanate useful in preparing polyurethanes via its reaction with polyether glycols, diols or amines can be used in this invention.

Examples of suitable diisocyanates include, but are not limited to, 2,4-toluene diisocyanate (TDI), 2,6-toluene diisocyanate, trimethyl hexamethylene diisocyanate (TMDI), 4,4'-diphenylmethane diisocyanate (MDI), 4,4'-dicyclohexylmethane diisocyanate ($H_{12}$MDI), 3,3'-dimethyl-4,4'-biphenyl diisocyanate (TODI), dodecane diisocyanate ($C_{12}$DI), m-tetramethylene xylylene diisocyanate (TMXDI), 1,4-benzene diisocyanate, trans-cyclohexane-1,4-diisocyanate, 1,5-naphthalene diisocyanate (NDI), 1,6-hexamethylene diisocyanate (HDI), 4,6-xylene diisocyanate, isophorone diisocyanate (IPDI), and combinations thereof.

Small amounts, typically less than about 3% by weight based on the weight of the diisocyanate, of monoisocyanates or polyisocyanates can be used in a mixture with the diisocyanate. Examples of useful monoisocyanates include alkyl isocyanates such as octadecyl isocyanate and aryl isocyanates such as phenyl isocyanate. Examples of useful polyisocyanates are triisocyanatotoluene HDI trimer and polymeric MDI.

Cross-Linking of Dispersant

The polyurethane dispersants have cross-linkable functional moieties pendent to the polymer backbone. The dispersants are thus capable of reacting with a cross-linking compound. Identified in the table below are suitable cross-linkable functional groups that are in the polymeric dispersant and the companion cross-linking groups that may be present in the cross-linking compound.

| Cross-linkable Moieties | Cross-linking Groups |
| --- | --- |
| COOH | Epoxide, Carbodiimide, Oxazoline, N-Methyol |
| Hydroxyl | Epoxide, Silane, Isocyanate, Diisocyanate, N-Methyol |
| Amino | Epoxide, Carbodiimide, Oxazoline, N-Methyol |

The cross-linkable moieties can be situated at the terminals of the polymer chain (group X in Formula I) or be incorporated into the $R^2$ group (in Formula I) of the polyurethane dispersant by selection of appropriate $Z^2$. Mixtures of these cross-linkable moieties may also be present in the polyurethane dispersant. Useful cross-linking compounds are those which are soluble or dispersible in the aqueous vehicle, including diisocyanates such as m-tetramethylxylene diisocyanate (TMXDI) and isophorone diisocyanate (IPDI), trimethylopropane polyglycidyl ether, polyglycerol polyglycidyl ether, oxazoline-functional polymers, waterborne polycarbodiimide resin, and silane.

The mole ratio of the cross-linkable moiety on the polymer chain to the cross-linking groups on the cross-linking agent is from 15:1 to 1:1.5, typically from 9:1 to 1:1.1, and most typically from 8:1 to 1:1. In calculating the mole ratio, all cross-linkable moieties on the polymer chain and all cross-linking groups on the cross-linking agent are included Colorants A wide variety of organic and inorganic pigments, alone or in combination, may be dispersed with the polyurethane dispersant to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment used with the inventive polyurethane dispersants does not include self-dispersed pigments. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

The polyurethane polymer dispersant is typically present in the range of from 0.1% to 20%, and more specifically from 0.2% to about 10%, by weight based on the weight of the total ink composition.

Preparation of Polyurethane Dispersant

The polyurethane dispersants of the present invention can be prepared by a one-step mixing or a stepwise method. The physical form of the polyurethane prior to its use as a dispersant is an aqueous dispersion. In the one-step mixing process, isocyanate terminated polyurethane is prepared by mixing $Z^1$, $Z^2$ and $Z^3$ in a solvent, followed by adding a diisocyanate to the mixture. This reaction is conducted at from about 40° C. to about 100° C., and typically from about 50° C. to about 90° C. The ratio of isocyanate to isocyanate reactive groups ($Z^1$, $Z^2$ and $Z^3$) is from about 1.3:1 to about 1.05:1, and more typically from about 1.25:1 to about 1.1:1. When the targeted percentage of isocyanate content is reached, a primary or secondary amine capping agent is added. The polyurethane solution is then converted to an aqueous dispersion via the addition of de-ionized water under a high shearing operation. Volatile solvent(s), if present, are distilled under reduced pressure.

The NCO-functional prepolymers should be substantially linear, and this may be achieved by maintaining the average functionality of the prepolymer starting components at or below 2:1.

In the stepwise method, a polyurethane is prepared by dissolving the $Z^1$ reactant in a solvent, followed by adding a diisocyanate to the mixture. Once the initial percentage of isocyanate content target is reached, the $Z^2$ and $Z^3$ components are added. This reaction is conducted at from about 40° C. to about 100° C., and typically from about 50° C. to about 90° C. The typical ratio of isocyanate to isocyanate reactive groups is from about 1.3:1 to about 1.05:1, and more typically from about 1.25:1 to about 1.1:1. Alternately, the $Z^2$ and $Z^3$ reactants may be reacted in the first step, and the $Z^1$ reactant may be added after the initial percentage of isocyanate content target is reached. When the final targeted percentage of isocyanate content is reached, a capping agent is added. The polyurethane solution is then converted to an aqueous polyurethane dispersion via the addition of water under a high shearing operation. Volatile solvent(s), if present, are distilled under reduced pressure.

Catalysts are not necessary for the preparation of the polyurethanes, but may provide advantages in a large scale manufacturing process. The catalysts most widely used are tertiary amines and organo-tin compounds such as stannous octoate, dibutyltin dioctoate and dibutyltin dilaurate.

Preparation of the polyurethane for subsequent conversion to a dispersion is facilitated by using a solvent. Suitable solvents are those that are miscible with water and inert to isocyanates and other reactants utilized in forming the polyurethanes. If it is desired to prepare a solvent-free dispersion, the solvent used should have sufficient volatility to allow its removal by distillation. Typical solvents useful in the practice of the present invention are acetone, methyl ethyl ketone, toluene, and N-methyl pyrolidone. Alternatively, the polyurethane can be prepared in a melt with less than 5% of solvent.

Mixtures of compounds or polymers having mixed NCO reactive groups can also be used in the preparation of the polyurethane of the present invention.

Processing conditions for preparing the NCO containing prepolymers are well known to one skilled in the art. The finished NCO-containing prepolymer should have an isocyanate content of from about 1 to about 20%, typically from about 1 to about 10% by weight, based on the weight of prepolymer solids.

As described above, a sufficient amount of the ionic groups must be neutralized so that the resulting polyurethane can have a proper balance of hydrophilicity and hydrophobicity. Typically the degree of neutralization is from 40% to 100%, and more typically from 50% to 70%, depending on the acid number of the polyurethane.

Suitable neutralizing agents for converting the acid groups to salt groups include tertiary amines, alkali metal cations and ammonia. Neutralizing agents can be trialkyl-substituted tertiary amines, such as triethyl amine, tripropyl amine, dimethylcyclohexyl amine, dimethylethanol amine, and triethanol amine and dimethylethyl amine. Substituted amines such as diethyl ethanol amine or diethanol methyl amine are also useful neutralizing agents.

Neutralization may take place at any point in the process. Typical procedures include at least some neutralization of the prepolymer, which is then chain extended/terminated in water in the presence of additional neutralizing agent.

The capping agent for terminating the polyurethane chain is usually a primary or secondary amine, an alcohol, or a mercapto. The amount of capping agent employed should be approximately equivalent to the free isocyanate groups in the prepolymer. The ratio of active hydrogens from amine in the capping agent to isocyanate groups in the prepolymer is in the range of from about 1.0:1.0 to about 3.0:1.0, more typically from about 1.0:1.0 to about 1.5:1.0, and still more typically from about 1.0:1.0 to about 1.05:1, on an equivalent basis.

Conversion of the polyurethane obtained from the methods described above to an aqueous dispersion is completed by addition of de-ionized water. If desired, solvent can then be removed partially or substantially by distillation under reduced pressure. The final product is a stable, aqueous polyurethane dispersion having a solids content of up to about 60% by weight, typically from about 10% to about 60% by weight, and more typically from about 20% to about 45% by weight. However, it is always possible to dilute the dispersions to any minimum solids content desired. The solids content of the resulting dispersion may be determined by drying the sample in an oven at 150° C. for 2 hours and comparing the weights before and after drying. The particle size is generally below about 1.0 micron, and typically between about 0.01 to about 0.5 micron. The average particle size should be less than about 0.5 micron, and typically between about 0.01 to about 0.3 micron. The small particle size enhances the stability of the dispersed particles Preparation of Pigmented Dispersions The pigmented dispersions used in this invention can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent and any optional additives to provide a blended "premix". Typically all liquid ingredients are added first, followed by the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a pigmented dispersion. Typically, grinding involves a media milling process, although other milling techniques can also be used. In the present invention, a lab-scale Eiger Minimill (Model M250, VSE EXP) manufactured by Eiger Machinery Inc., Chicago, Ill., is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton. Mass.) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Preparation of Cross-Linked Pigment Dispersion

In the cross-linking step, a cross-linking compound is mixed with the pigmented dispersions prepared above at room temperature or elevated temperature for a period from 6 h to 8 h. To facilitate the cross-linking reaction, it may be desirable to add a catalyst. Useful catalysts can be those that are either soluble or insoluble in the liquid and can be selected depending upon the crosslinking reactions. Some suitable catalysts include dibutyltin dilaurate (DBTDL), tributyl amine ("TBA") and dimethyldodecyl amine. After the cross-linking reaction is completed, the pH of the cross-linked dispersion can be adjusted to at least about 8.0, more typically to between 8.0 and 12.0, and most typically between 8.0 and 11.0, if needed. Optionally, the dispersion may be further processed using conventional filtration procedures known in the art. The dispersions may be processed using ultrafiltration techniques that remove co-solvents and other contaminants, ions or impurities from the dispersion. Each dispersion can be then tested for pH, conductivity, viscosity and particle size. Dispersion stability is deemed important to demonstrating the utility of the dispersant employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Cross-Linked Polyurethane Binder

The cross-linked polyurethane binders are discussed in U.S. Patent Application Publication No. 20050182154, which is incorporated by reference herein as if fully set forth, under the section entitled "Polyurethane Dispersoid Binders (PUDs)". The cross-linked polyurethane binder is different from the polyurethane dispersant described above and non-reactive to the colorant. The cross-linked polyurethane binder is typically added to an ink during the final formulation stage, not during the preparation of a pigment dispersion. The presence of the cross-linked polyurethane binder of the present disclosure allows printing on textile without any melamine crosslinker in an ink. This offers the advantage of not having to fuse the substrate at elevated temperature after printing or acidic conditions to cause crosslinking of melamine.

Ink Vehicle

The pigmented ink of this disclosure comprises an ink vehicle typically an aqueous ink vehicle, also known as an aqueous carrier medium, the aqueous dispersion and optionally other ingredients.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s The following examples illustrate the invention without, however, being limited thereto.

EXAMPLES

Extent of Polyurethane Reaction

The extent of polyurethane reaction was determined by a titration with dibutylamine to detect the isocyanate content (NCO %), a common method used in urethane chemistry.

In this method, a sample of the isocyanate containing prepolymer is reacted with a known amount of dibutylamine solution, and the residual amine is back titrated with aqueous HCl.

Particle Size Measurements

The particle size for the polyurethane dispersions, pigments and the inks were determined by dynamic light scattering using a Microtrac® UPA 150 analyzer from Honeywell/Microtrac (Montgomeryville Pa.).

This technique is based on the relationship between the velocity distribution of the particles and the particle size.

Laser generated light is scattered from each particle and is Doppler shifted by the particle Brownian motion. The frequency difference between the shifted light and the unshifted light is amplified, digitalized and analyzed to derive the particle size distribution. Results are reported as D50 and D95.

Solid Content Measurement

Solid content for the solvent free polyurethane dispersions was measured with a moisture analyzer, Model MA50 from Sartorius. For polyurethane dispersions containing a high boiling solvent, such as NMP, tetraethylene glycol dimethyl ether, or sulfolane, the solid content was determined by the weight difference before and after baking in an oven set at 150° C. oven for 180 minutes.

Preparation of Polyurethane Dispersants

A total of four polyurethane dispersants as listed in Table 1 below were prepared. These dispersants were later used for preparing pigmented dispersions and crossed-linked pigment dispersions.

TABLE 1

| Dispersant # | Polyerethane Structure | Acid Number (mg KOH/g solids) |
| --- | --- | --- |
| Dispersant 1 | DEA Terminated TMXDI/Terathane650 | 60 |
| Dispersant 2 | DEA Terminated TMXDI/Terathane650 | 80 |
| Dispersant 3 | DEA Terminated IPDI/Terathane650 | 60 |
| Dispersant 4 | BMEA Terminated TMXDI/UH-50 | 55 |

Polyurethane Dispersant 1 (DEA Terminated TMXDI/Terathane650)

To a dry, alkali- and acid-free flask equipped with an additional funnel, a condenser and a stirrer, under a nitrogen atmosphere was added Terathane® 650 (135 g), DMPA (54 g), Sulfolane (132 g) and DBTL (0.06 g). The resulting mixture was heated to 60° C. and thoroughly mixed. To this mixture was added TMXDI (164 g) via the additional funnel followed by rinsing any residual TMXDI in the additional funnel into the flask with Sulfolane (15 g). The temperature for the reaction mixture was raised to 100° C. and maintained at 100° C. until the isocyanate content reached 1.3% or below. The temperature was then cooled to 60° C. and maintained at 60° C. while DEA (12.9 g) was added via the additional funnel mounted on the flask over a period of 5 minutes followed by rinsing the residual DEA in the additional funnel into the flask with Sulfolane (5 g). After holding the temperature for 1 hr at 60° C., aqueous KOH (376 g, 3% by weight) was added over a period of 10 minutes via the additional funnel followed by de-ionized water (570 g). The mixture was maintained at 60° C. for 1 hr and cooled to room temperature to provide a polyurethane dispersant with 24% of solids.

Polyurethane Dispersant 2 (DEA Terminated TMXDI/Terathane650)

To a dry, alkali- and acid-free flask equipped with an additional funnel, a condenser and a stirrer, under a nitrogen atmosphere was added Terathane® 650 (100 g), DMPA (70 g), Sulfolane (130 g) and DBTL (0.06 g). The resulting mixture was heated to 60° C. and thoroughly mixed. To this mixture was added TMXDI (182 g) via the additional funnel mounted on the flask followed by rinsing any residual TMXDI in the additional funnel into the flask with Sulfolane (15 g). The temperature for the reaction mixture was raised to 100° C. and maintained at 100° C. until the isocyanate content reached 1.3% or below. The temperature was then cooled to 60° C. and maintained at 60° C. while DEA (14.6 g) was added via the additional funnel over a period of 5 minutes followed by rinsing the residual DEA in the additional funnel into the flask with Sulfolane (5 g). After holding the temperature for 1 hr at 60° C., aqueous KOH (487.5 g, 3% by weight) was added over a period of 10 minutes via the additional funnel followed by de-ionized water (461 g). The mixture was maintained at 60° C. for 1 hr and cooled to room temperature to provide a polyurethane dispersant with 22% of solids.

Polyurethane Dispersant 3 (DEA Terminated IPDI/Terathane650)

To a dry, alkali- and acid-free flask equipped with an additional funnel, a condenser and a stirrer, under a nitrogen atmosphere was added Terathane® 650 (155 g), DMPA (54 g), Sulfolane (237 g) and DBTL (0.06 g). The resulting mixture was heated to 60° C. and thoroughly mixed. To this mixture was added IDPI (157 g) via the additional funnel mounted on the flask followed by rinsing any residual IDPI in the additional funnel into the flask with Sulfolane (15 g). The temperature for the reaction mixture was raised to 85° C. and maintained at 85° C. until the isocyanate content reached 1.2% or below. The temperature was then cooled to 60° C. and maintained at 60° C. while DEA (13.8 g) was added via the additional funnel over a period of 5 minutes followed by rinsing the residual DEA in the additional funnel into the flask with Sulfolane (5 g). After holding the temperature for 1 hr at 60° C., aqueous KOH (526.5 g, 3% by weight) was added over a period of 10 minutes via the additional funnel followed by de-ionized water (356 g). The mixture was maintained at 60° C. for 1 hr and cooled to room temperature to provide a polyurethane dispersant with 20.16% of solids.

Polyurethane Dispersant 4 (BMEA terminated TMXDI/UH-50)

To a dry, alkali- and acid-free, 2 liter flask equipped with an additional funnel, a condenser and a stirrer, under a nitrogen atmosphere was added Eternacoll® UH-50 (351.1 g), DMPA (261.0 g) and Sulfolane (663.8 g). The contents were heated to 115° C. and mixed under a nitrogen gas purge for 30 minutes. The temperature was then lowered to 60° C. and DBTL (0.08 g) was added followed by TMXDI (713.6 g) via the addition funnel mounted to the flask. The residual TMXDI in the additional funnel was rinsed into the flask with Sulfolane (48.2 g). The stirred reaction mass was allowed to exotherm to 123° C. When exotherm began to slow, the temperature was maintained at 102° C. while monitoring the isocyanate content until it reached 1.01%. Additional Sulfolane (209.7 g) was added to the reactor, and the temperature was lowered to 85.6° C. To the flask was added BMEA (68.88 g) via the additional funnel followed by rinsing the residual BMEA in additional funnel into the flask with Sulfolane (15.24 g). The mixture was maintained at 85.3° C. for 90 minutes and cooled to room temperature to provide a polyurethane dispersion having 59.81% of solids and a measured acid number of 83.2 mg KOH/gram polymer.

To a dry, alkali- and acid-free, 2 liter kettle, equipped with an addition funnel, a condenser, a stirrer and a nitrogen gas line was added the above prepared polyurethane solid (501.5 g) and phenyl glycidyl ether (22.88 g). The mixture was heated and maintained at 85° C. with stirring while the acid number was followed until it reached 55.15 mg KOH/g resin. To the mixture was added a solution of KOH (11.8 g) in de-ionized water (766.6 g) over a period of 10 minutes while stirring was maintained. The reaction temperature dropped to 51.8° C. at the end of this water inversion step. The polyurethane dispersant thus prepared had 22.82% of solids.

Additional dispersants were prepared using cyclic amines as terminating amines.

Using Morpholine as a Terminating Amine

To a dry, alkali- and acid-free flask equipped with an additional funnel, a condenser and a stirrer, under a nitrogen atmosphere was added Terathane® 650 (300 g), DMPA (180 g), Sulfolane (876 g) and DBTL (0.12 g). The resulting mixture was heated to 60° C. and thoroughly mixed. To this mixture was added IDPI (438 g) via the additional funnel mounted on the flask followed by rinsing any residual IDPI in the additional funnel into the flask with Sulfolane (15 g). The temperature for the reaction mixture was raised to 85° C. and maintained at 85° C. until the isocyanate content reached 0.8% or below. The temperature was then cooled to 60° C. and maintained at 60° C. while Morpholine (30 g) was added via the additional funnel over a period of 5 minutes followed by rinsing the residual Morpholine in the additional funnel into the flask with Sulfolane (5 g). After holding the temperature for 1 hr at 60° C., aqueous KOH (1755 g, 3% by weight) was added over a period of 10 minutes via the additional funnel followed by de-ionized water (207 g). The mixture was maintained at 60° C. for 1 hr and cooled to room temperature to provide a polyurethane dispersant with 25% of solids.

Preparation of Pigmented Dispersions

Pigmented dispersions were prepared with magenta and cyan pigments. For the examples in Table 2, PR122 (magenta) and TRB-2 (cyan) were employed.

The following procedure was used to prepare pigmented dispersions with the polyurethane dispersants listed in Table 1. Using an Eiger Minimill, a premix was prepared at typically 20-30% pigment loading and the targeted dispersant level was selected at a pigment/dispersant (P/D) ratio of 1.5-3.0. A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar co-solvents are suitable, triethylene glycol monobutyl ether (TEB as supplied from Dow Chemical) was the co-solvent of choice. The polyurethane dispersants of the present invention were pre-neutralized with either KOH or amine to facilitate solubility and dissolution into water. During the premix stage, the pigment level was maintained at typically 27%, and was subsequently reduced to about 24% during the milling stage by the addition of de-ionized water for optimal media mill grinding conditions. After completion of the milling stage, which was typically 4 hours, the remaining letdown of de-ionized water was added and thoroughly mixed.

All the pigmented dispersions processed with co-solvent were purified using an ultrafiltration process to remove co-solvent(s) and filter out other impurities that may be present. After completion, the pigment levels in the dispersions were reduced to about 10 to 15%. A total of 4 different magenta (M1-M4) and 1 cyan (C1) dispersions listed in Table 2 were prepared using the polyurethane dispersants of the present invention.

TABLE 2

| Pigmented Dispersion | Pigment | Pigment/ Dispersant | Polyurethane Dispersant No. | Particle Size D50 (nm) | D95 (nm) |
|---|---|---|---|---|---|
| M1 | PR122 | 3 | 1 | 99 | 210 |
| M2 | PR122 | 3 | 2 | 115 | 209 |
| M3 | PR122 | 3 | 3 | 101 | 172 |
| M4 | PR122 | 3 | 4 | 96 | 198 |
| C1 | TRB-2 | 3 | 1 | 90 | 203 |

Preparation of Cross-Linked Pigment Dispersion

In the cross-linking step, a cross-linking compound was mixed with one of the pigmented dispersions listed in Table 2, and heated between 60° C. and 80° C. with efficient stirring for between 6 to 8 hours. After the cross-linking reaction was completed, the pH was adjusted to at least about 8.0 if needed. A total of six cross-linked pigment dispersions as listed in Table 3 were prepared. The corresponding pigmented dispersions, cross-linkable moieties and cross-linking compounds are also listed in Table 3.

TABLE 3

| Cross-linked Dispersion | Pigmented Dispersion | Cross-linkable Moiety | Cross-linking Compound |
|---|---|---|---|
| XL-M1 | M1 | COOH, OH | Denacol ® 321 |
| XL-M2 | M2 | COOH, OH | Denacol ® 321 |
| XL-M3-A | M3 | COOH, OH | Denacol ® 321 |
| XL-M3-B | M3 | COOH, OH | Denacol ® 313 |
| XL-M4 | M4 | COOH, OH | Denacol ® 321 |
| XL-C1 | C1 | COOH, OH | Denacol ® 321 |

Cross-Linked Polyurethane Binder

The Polyurethane Dispersoid 1 (PUD EX1) described in U.S. Patent Application Publication No. 20050182154 was employed as the cross-linked polyurethane binder.

The Comparative Polyurethane Dispersoid (Comp. PUD 1), the un-crosslinked version of PUD EX1, described in U.S. Patent Application Publication No. 20050182154 was employed as a comparative example.

Preparation of Ink and Testing of Print Properties

The inks were prepared by conventional processes known to one skilled in the art using the crossed-linked pigment dispersions and the cross-linked polyurethane binder described above. The inks are processed by routine operations suitable for ink-jet ink formulation.

Inks were prepared by stirring together a mixture of a crossed-linked pigment dispersion, a binder, and an aqueous vehicle. Cross-linked pigment dispersion and cross-linked binder were added in amounts that resulted in 3% of pigment solids in the final ink and a binder/pigment ratio (B/P) of 3. Three series of inks were prepared as listed in Table 4 below. Each series contains K, C, M, Y, R, G and B color inks.

TABLE 4

| Ink Series | Dispersant Type | Binder |
|---|---|---|
| 1 | Cross-linked Polyurethane | PUD-EX1 |
| 2 | Acrylic | PUD-EX1 |
| 3 | Cross-linked Polyurethane | Comp. PUD1 |

All inks were printed on a textile substrate using an AnaJet MP-10 DTG printer with AnaRip software supplied with the printer at a setting of 600×600 dpi. The L*a*b* values were measured using an X-Rite densitometer. The color values were converted to saturation values by the equation S=chroma(C)/L* with the exception for black where the measurements are L* values. The lower the L* value, the darker the black. This value is commonly used to measure black.

Table 5 below contains color data for printing on Beefy t-Shirt.

TABLE 5

| Color Saturation | Beefy Ink Series 1 | Beefy Ink Series 2 | Beefy Ink Series 3 |
|---|---|---|---|
| 100% K (L*) | 29.94 | 32.37 | 33.29 |
| 100% C | 0.68 | 0.53 | 0.45 |
| 100% M | 1.28 | 1.09 | 1.08 |
| 100% Y | 0.79 | 0.83 | 0.83 |
| 100% R | 1.22 | 0.99 | 0.98 |
| 100% G | 0.76 | 0.68 | 0.69 |
| 100% B | 0.96 | 0.92 | 0.85 |

Table 6 below contains color data for printing on 419 woven corron.

TABLE 6

| | woven cotton | | |
|---|---|---|---|
| Color Saturation | 419 Ink Series 1 | 419 Ink Series 2 | 419 Ink Series 3 |
| 100% K (L*) | 30.24 | 29.12 | 30.98 |
| 100% C | 0.86 | 0.89 | 0.86 |
| 100% M | 1.20 | 1.20 | 1.18 |
| 100% Y | 0.89 | 0.89 | 0.91 |
| 100% R | 1.11 | 1.09 | 1.05 |
| 100% G | 0.79 | 0.80 | 0.81 |
| 100% B | 1.05 | 1.00 | 0.91 |

Colorfastness to crocking was also determined by AATCC Crockmeter Method, AATCC Test Method 8-1996. The ratings for these tests were from 1-5 with 5 being the best result, that is, little or no loss of color and little or no transfer of color to another material, respectively. The results were rounded to the nearest 0.5, which was judged to be accurate for this method. The dry crock data for 419 woven cotton is shown in Table 7, and the wet crock data for 419 woven cotton is shown in Table 8.

TABLE 7

| | Ink | | |
|---|---|---|---|
| Dry Crock | Ink Series 1 | Ink Series 2 | Ink Series 3 |
| K | 3.5 | 2.5 | 1-1.5 |
| C | 4 | 3.5 | 1-1.5 |
| M | 4 | 3 | 1-1.5 |
| Y | 3 | 3 | 1-1.5 |
| R | 3.5 | 3 | 1-1.5 |
| G | 3.5 | 3 | 1-1.5 |
| B | 3.5 | 3 | 1-1.5 |

TABLE 8

| | Ink | | |
|---|---|---|---|
| Wet Crock | Ink Series 1 | Ink Series 2 | Ink Series 3 |
| K | 2.5 | 2 | 1-1.5 |
| C | 3 | 3 | 1-1.5 |
| M | 3 | 2.5 | 1-1.5 |
| Y | 3 | 2.5 | 1-1.5 |
| R | 3.5 | 3 | 1-1.5 |

TABLE 8-continued

| | Ink | | |
|---|---|---|---|
| Wet Crock | Ink Series 1 | Ink Series 2 | Ink Series 3 |
| G | 3 | 3 | 1-1.5 |
| B | 3 | 3 | 1-1.5 |

What is claimed is:

1. An ink-jet ink for printing on textile comprising an aqueous ink vehicle, an aqueous pigment dispersion and a cross-linked polyurethane binder, wherein said aqueous pigment dispersion is prepared by dispersing a colorant with a polyurethane dispersant followed by cross-linking of said dispersant, and said cross-linked polyurethane binder is different from said polyurethane dispersant and non-reactive to said colorant, and wherein said polyurethane dispersant prior to being cross-linked comprises at least one compound of the general structure of Formula I:

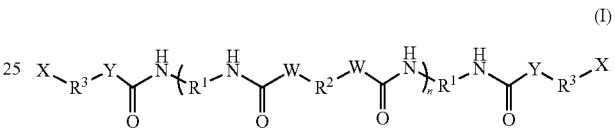

(I)

wherein each X is independently OH, SH, COOH or $NR^4R^5$;
each Y is independently O, S or $NR^4$;
each W is NH, O or S;
each $R^1$ is independently $C_1$-$C_{20}$ alkylene, $C_3$-$C_{20}$ substituted alkylene, $C_6$-$C_{40}$ arylene or $C_9$-$C_{40}$ substituted arylene;
$R^2$ is comprised of difunctional isocyanate reactants $Z^1$, $Z^2$ and $Z^3$, wherein $Z^2$ may be the same as $Z^1$, or $Z^2$ may be the same as $Z^3$, provided that $Z^2$ has one or more cross-linkable moieties;
each $R^3$ is independently $C_1$-$C_{20}$ alkyl or $C_3$-$C_{20}$ substituted alkyl;
each $R^4$ is independently —$R^3$—A, $C_1$-$C_{20}$ alkyl or $C_3$-$C_{20}$ substituted alkyl;
each A is independently OH, SH or COOH;
each $R^5$ is independently $C_1$-$C_{20}$ alkyl or $C_3$-$C_{20}$ substituted alkyl;
$NR^4R^5$ can be taken together with Z to form a 5-membered through 7-membered cyclic structure of Formula II:

(II)

Z is —(CH$_2$)—, —(CH$_2$)$_2$—, NR$^6$, O or S;
$R^6$ is H or $C_1$-$C_{20}$ alkyl;
n is an integer from 2 to 30;
$Z^1$ is a difunctional isocyanate reactant substituted with an aqueous dispersing moiety;
$Z^2$ is a difunctional isocyanate reactant substituted with one or more cross-linkable moieties; and
$Z^3$ is a polyol with a weight average molecular weight of less than 3000.

2. The ink of claim 1, wherein said ink does not contain a melamine crosslinker.

3. The ink of claim 1, wherein the cross-linking agent is one or more members selected from the group consisting of epoxide, isocyanate, carbodiimide, N-methylol, oxazoline, silane, and mixtures thereof.

4. The ink of claim 3, wherein Y is $NR^4$.

5. The ink of claim 4, wherein X is OH.

6. The ink of claim 4, wherein X is $NR^4R^5$.

7. The ink of claim 6, wherein $NR^4R^5$ is taken together with Z to form a 5-membered through 7-membered cyclic structure of Formula II:

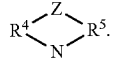

(II)

8. The ink of claim 7, wherein $NR^4R^5$ is taken together with Z to form a 6-membered ring.

9. The ink of claim 8, wherein Z is O.

10. The ink of claim 9, wherein $R^4$ and $R^5$ are independently $C_1$-$C_3$ alkylene.

* * * * *